United States Patent
Buitron et al.

(10) Patent No.: US 7,052,739 B2
(45) Date of Patent: May 30, 2006

(54) METHOD OF LUBRICATING MULTIPLE MAGNETIC STORAGE DISKS IN CLOSE PROXIMITY

(75) Inventors: Gerardo Buitron, San Jose, CA (US); Peter Cheng, Fremont, CA (US); Walter Crofton, Castro Valley, CA (US); Kwang Kon Kim, San Jose, CA (US); William Maida, San Jose, CA (US); David Newman, Fremont, CA (US)

(73) Assignee: Maxtor Corporation, Longmont, CO (US)

( * ) Notice: Subject to any disclaimer, the term of this patent is extended or adjusted under 35 U.S.C. 154(b) by 12 days.

(21) Appl. No.: 10/434,540

(22) Filed: May 9, 2003

(65) Prior Publication Data

US 2003/0209389 A1    Nov. 13, 2003

Related U.S. Application Data

(60) Provisional application No. 60/417,668, filed on Oct. 10, 2002, provisional application No. 60/378,972, filed on May 9, 2002.

(51) Int. Cl.
*B05D 1/18* (2006.01)
(52) U.S. Cl. .................. 427/430.1; 118/423; 118/428; 118/500
(58) Field of Classification Search ............ 427/430.1, 427/443; 118/500, 428, 423; 29/603.01, 29/604; 360/135
See application file for complete search history.

(56) References Cited

U.S. PATENT DOCUMENTS

| 4,573,851 A | 3/1986 | Butler .................. 414/404 |
| 4,669,612 A | 6/1987 | Mortensen ............... 206/454 |
| 4,676,008 A | 6/1987 | Armstrong .............. 34/237 |
| 4,694,778 A | 9/1987 | Learn et al. ............. 118/728 |
| 4,695,217 A | 9/1987 | Lau ...................... 414/404 |
| 4,724,963 A | 2/1988 | Mortensen ............... 206/454 |
| 4,819,579 A | 4/1989 | Jenkins .................. 118/728 |
| 4,840,530 A | 6/1989 | Nguyen .................. 414/404 |
| 4,856,957 A | 8/1989 | Lau et al. ................ 414/404 |
| 4,947,624 A | 8/1990 | Cones, Sr. et al. ........ 53/540 |
| 4,947,784 A | 8/1990 | Nishi .................... 414/404 |
| 4,949,848 A | 8/1990 | Kos ...................... 211/41 |
| 4,958,982 A | 9/1990 | Champet et al. ......... 414/751.1 |
| 4,981,222 A | 1/1991 | Lee ...................... 211/41 |
| 4,987,407 A | 1/1991 | Lee ...................... 340/540 |

(Continued)

FOREIGN PATENT DOCUMENTS

EP    0 177 073    8/1985

(Continued)

OTHER PUBLICATIONS

Australian Written Opinion and Search Report, Dec. 17, 2004, Singapore Application No. SG200302857-8.

(Continued)

*Primary Examiner*—Katherine Bareford
(74) *Attorney, Agent, or Firm*—Sheridan Ross P.C.

(57) ABSTRACT

Various apparatus and methods are provided for lubricating hard memory disks. A mandrel is provided in one embodiment with three rows of teeth and provides a stable, three-point engagement with the inside edge of the disks at the center aperture. When removing disks from a cassette, the mandrel preferably places a uniform space between the disks. In a second embodiment, the mandrel may be used to lubricate single-sided hard memory disks. The single-sided hard memory disk may be positioned on the mandrel in pairs in a gap merge orientation, or equally spaced apart.

15 Claims, 12 Drawing Sheets

U.S. PATENT DOCUMENTS

| | | | |
|---|---|---|---|
| 5,007,788 A | 4/1991 | Asano et al. | 414/416.09 |
| 5,111,936 A | 5/1992 | Kos | 206/334 |
| 5,125,784 A | 6/1992 | Asano | 414/404 |
| 5,188,499 A | 2/1993 | Tarng et al. | 414/404 |
| 5,269,643 A | 12/1993 | Kodama et al. | 414/416 |
| 5,314,107 A | 5/1994 | D'Aragona et al. | 228/116 |
| 5,348,151 A | 9/1994 | Dressen | 206/334 |
| 5,430,992 A | 7/1995 | Olson | 53/399 |
| 5,476,176 A | 12/1995 | Gregerson et al. | 206/711 |
| 5,486,134 A | 1/1996 | Jones et al. | 451/209 |
| 5,501,568 A | 3/1996 | Ono | 414/417 |
| 5,620,295 A | 4/1997 | Nishi | 414/416.11 |
| 5,780,127 A | 7/1998 | Mikkelsen | 428/35.7 |
| 5,820,449 A | 10/1998 | Clover | 451/287 |
| 5,906,469 A | 5/1999 | Oka et al. | 414/416 |
| 5,976,255 A * | 11/1999 | Takaki et al. | 118/500 |
| 6,033,522 A | 3/2000 | Iwata et al. | 156/345 |
| 6,107,599 A | 8/2000 | Baumgart et al. | 219/121.77 |
| 6,345,947 B1 | 2/2002 | Egashira | 414/225.01 |
| 6,354,794 B1 | 3/2002 | Sato et al. | 414/811 |
| 6,368,040 B1 | 4/2002 | Yamasaki et al. | 414/222 |
| 6,427,850 B1 | 8/2002 | Mendiola | 211/41.18 |
| 6,457,929 B1 | 10/2002 | Sato et al. | 414/404 |
| 6,582,279 B1 | 6/2003 | Fox et al. | 451/37 |
| 6,612,801 B1 | 9/2003 | Koguchi | 414/416.02 |
| 6,625,835 B1 | 9/2003 | Frost et al. | 15/77 |
| 6,626,744 B1 | 9/2003 | White et al. | 451/66 |
| 6,769,855 B1 | 8/2004 | Yokomori et al. | 414/416.02 |
| 2002/0006324 A1 | 1/2002 | Sato et al. | 414/416.12 |
| 2003/0208899 A1 | 11/2003 | Grow et al. | 29/458 |
| 2003/0209421 A1 | 11/2003 | Buitron et al. | 204/192.2 |
| 2003/0210498 A1 | 11/2003 | Kim et al. | 360/135 |
| 2003/0211275 A1* | 11/2003 | Buitron et al. | 428/64.1 |
| 2003/0211361 A1 | 11/2003 | Kim et al. | 428/694 R |
| 2004/0013011 A1 | 1/2004 | Valeri | 365/200 |
| 2004/0016214 A1 | 1/2004 | Buitron | 53/474 |
| 2004/0035737 A1 | 2/2004 | Buitron et al. | 206/454 |
| 2004/0068862 A1 | 4/2004 | Buitron et al. | 29/604 |
| 2004/0069662 A1 | 4/2004 | Buitron et al. | 206/307.1 |
| 2004/0070092 A1 | 4/2004 | Buitron et al. | 264/1.33 |
| 2004/0070859 A1 | 4/2004 | Crofton et al. | 360/1 |
| 2004/0071535 A1 | 4/2004 | Crofton et al. | 414/416.09 |

FOREIGN PATENT DOCUMENTS

| | | |
|---|---|---|
| EP | 0 192 244 | 2/1986 |
| EP | 768704 | 4/1997 |
| JP | 7-263521 | 10/1995 |
| JP | 08273210 | 10/1996 |
| JP | 2001232667 | 8/2001 |

OTHER PUBLICATIONS

Mar. 12, 2005 Invitiation to Respond to Written Opinion from Intellectual Property Office of Singapore to Tan Jinhwee, Eunice & Lim Chooeng.

* cited by examiner

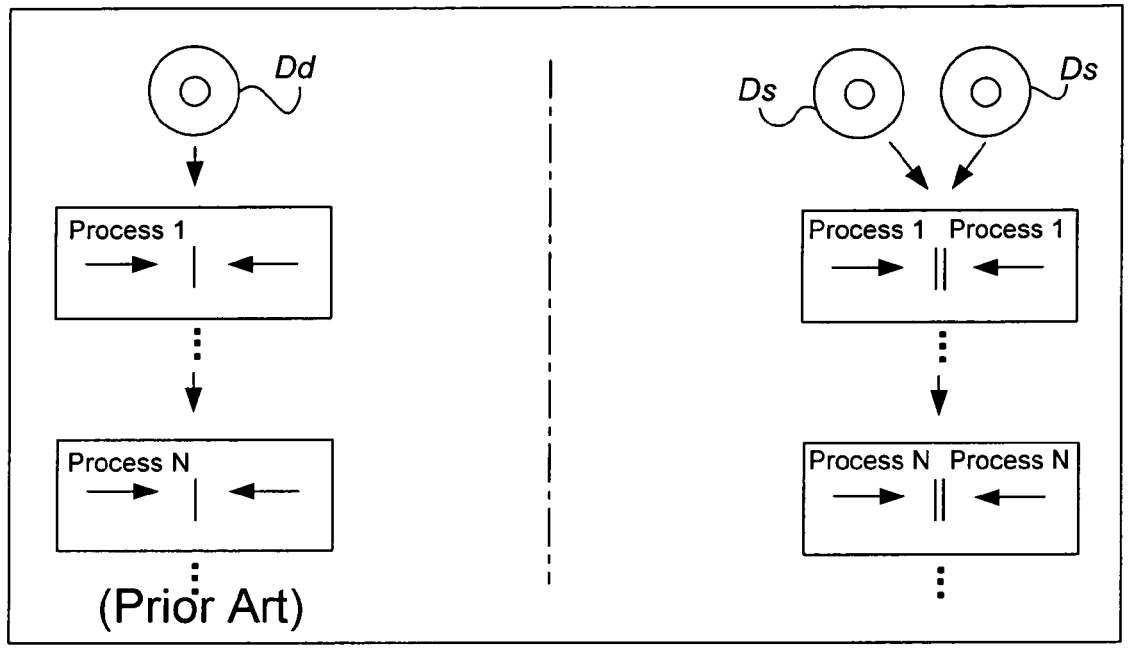
FIG. 1
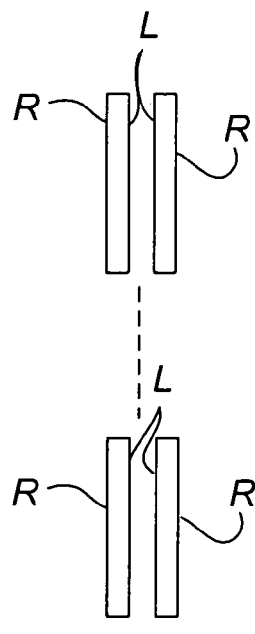  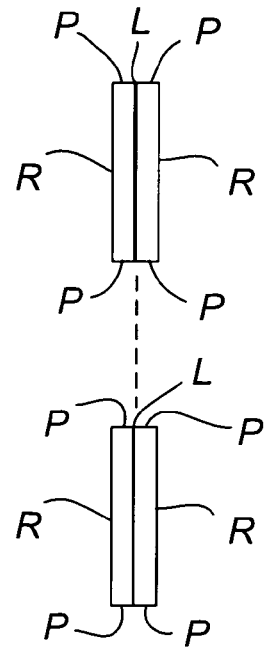  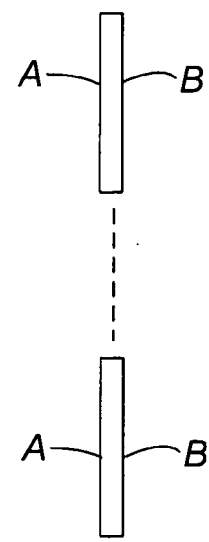
FIG. 2   FIG. 3   FIG. 4
(Prior Art)

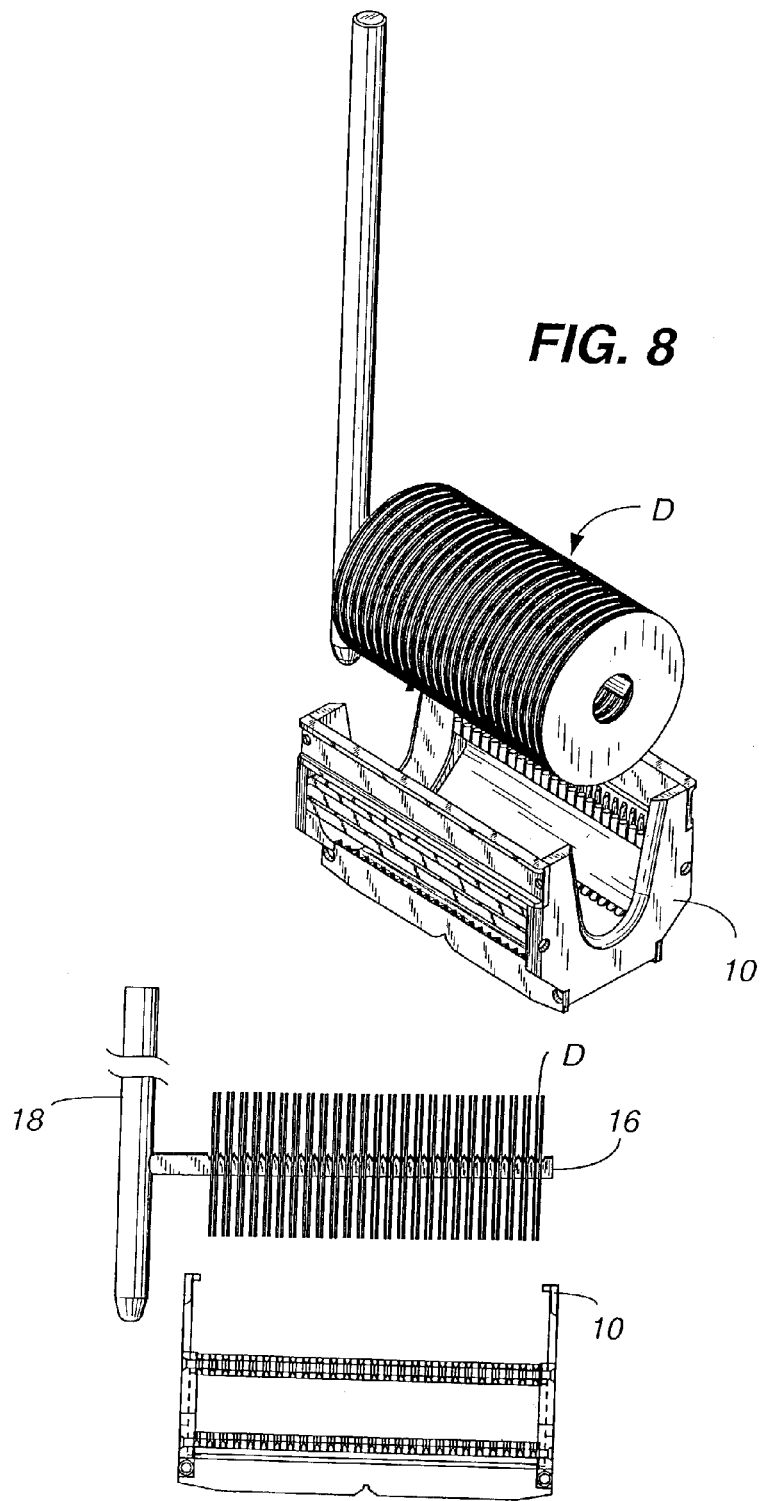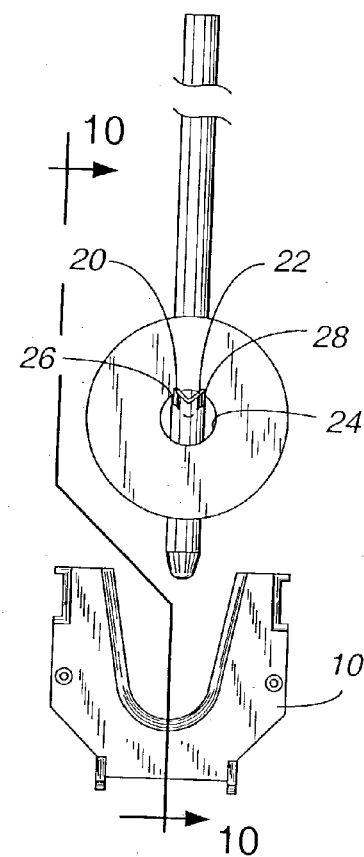

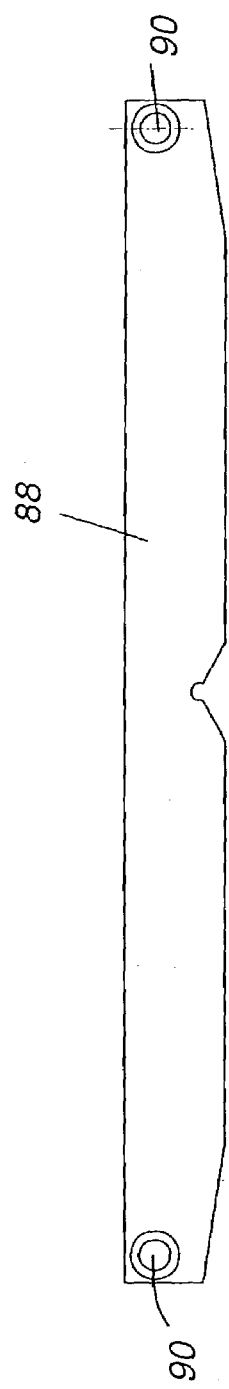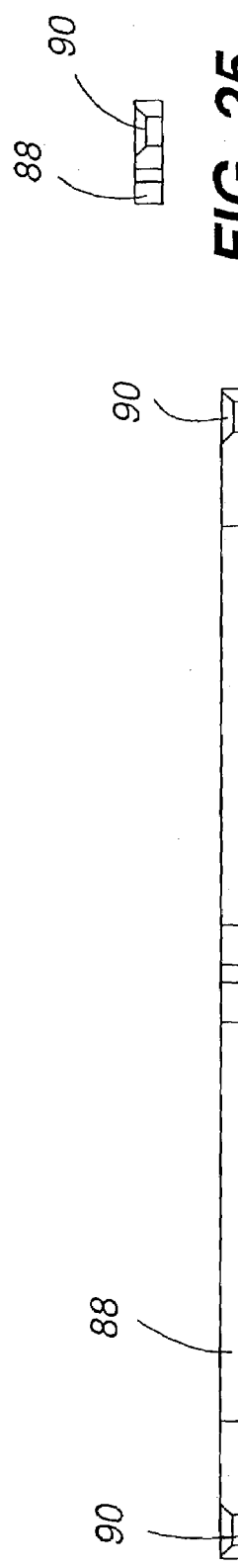

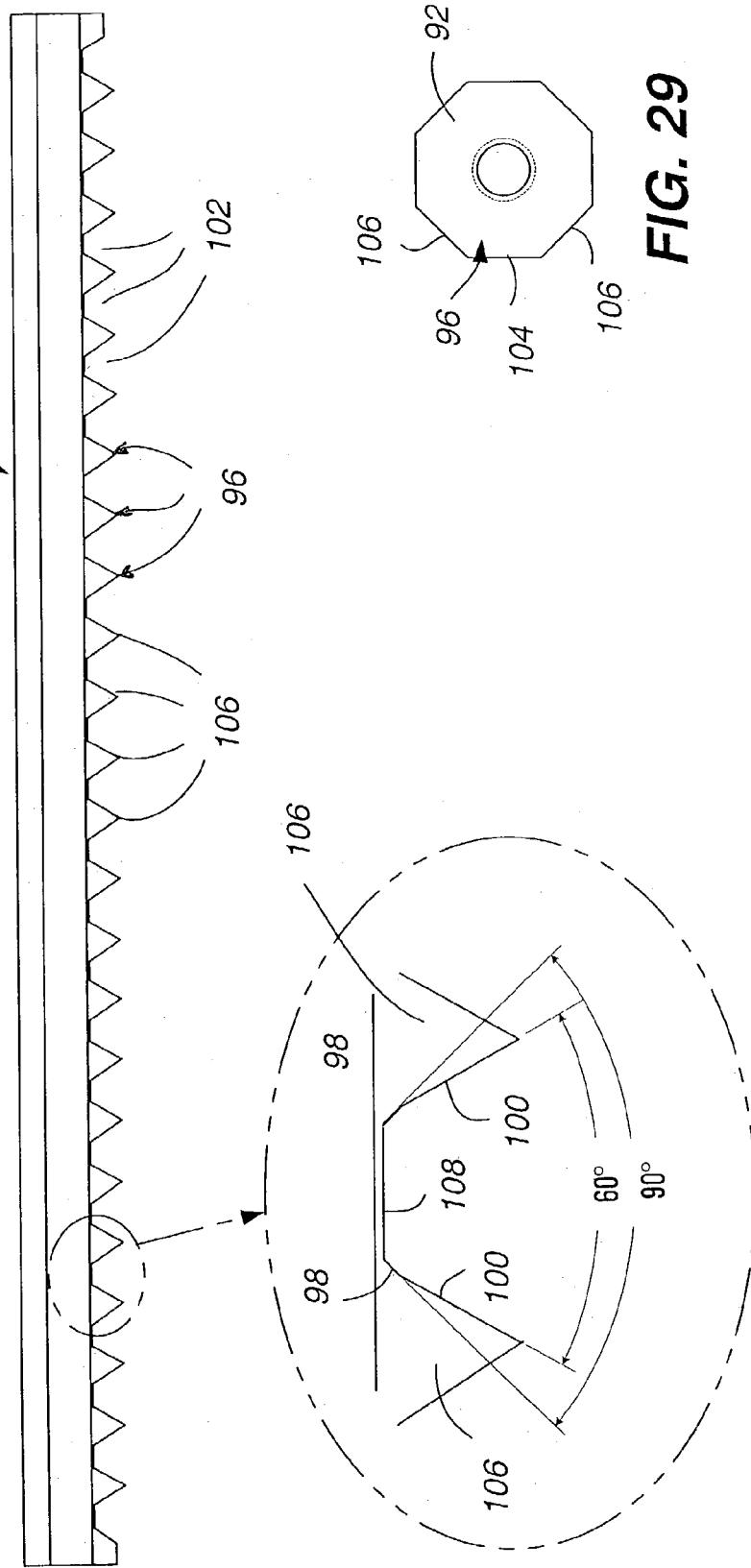
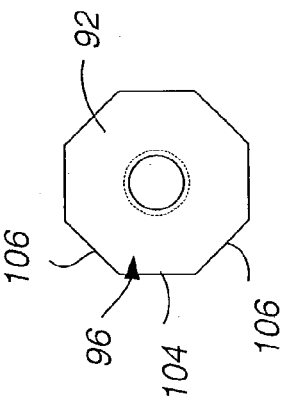
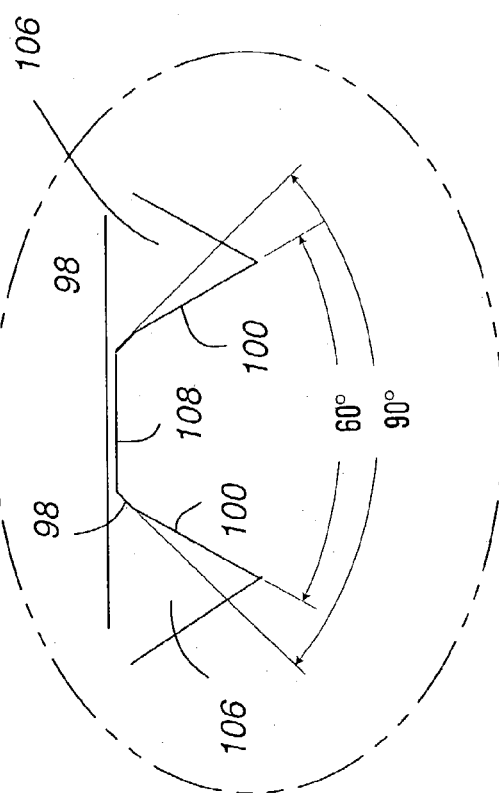
FIG. 27
FIG. 29
FIG. 28

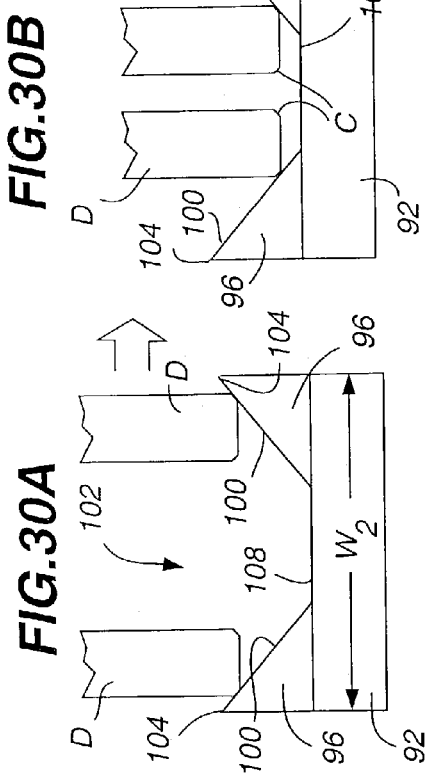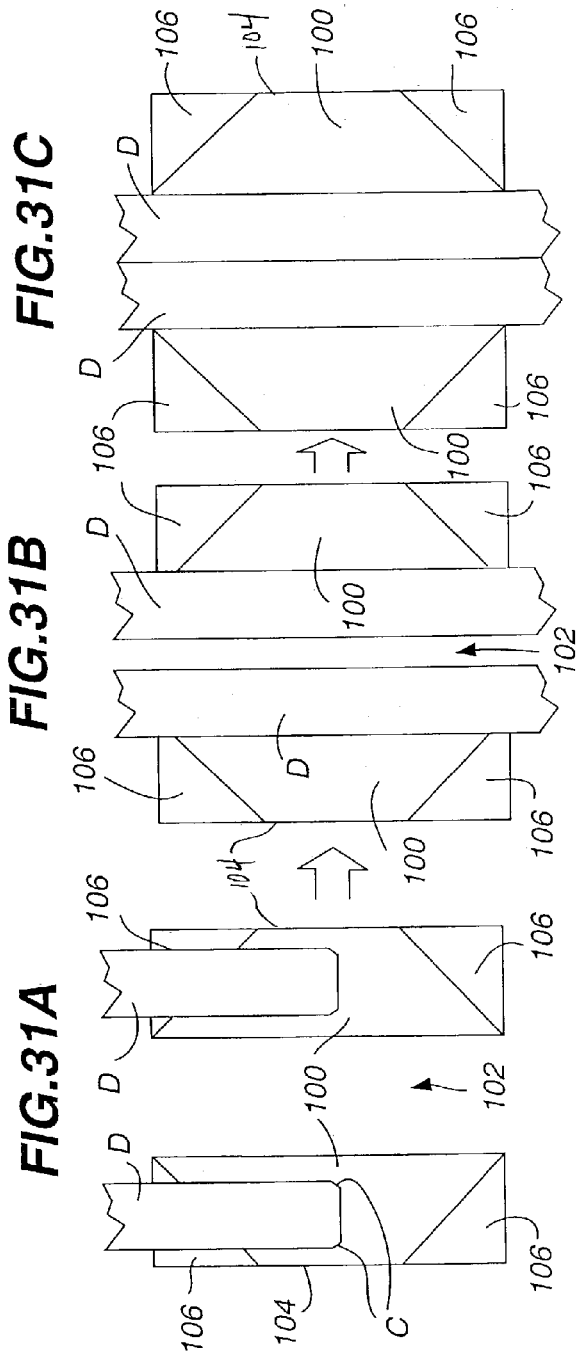

METHOD OF LUBRICATING MULTIPLE MAGNETIC STORAGE DISKS IN CLOSE PROXIMITY

CROSS REFERENCE TO RELATED APPLICATIONS

Priority is claimed from U.S. Provisional Patent Application Ser. Nos. 60/378,972, filed May 9, 2002, and 60/417,668, filed Oct. 10, 2002, which are incorporated by reference herein in their entirety.

The subject matter of the present application is related to the following applications, each of which has a filing date of May 9, 2003: U.S. patent application Ser. No. 10/434,550 entitled "Single-Sided Sputtered Magnetic Recording Disks" in the name of Clasara et al. (Publication No. US-2003-0211361-A1); U.S. patent application Ser. No. 10/435,361 entitled "Dual Disk Transport Mechanism Processing Two Disks Tilted Toward Each Other" in the name of Grow et al. (Publication No. US-2003-0208899-A1); U.S. patent application Ser. No. 10/435,358 entitled "Information-Storage Media With Dissimilar Outer Diameter and/or Inner Diameter Chamfer Designs On Two Sides" in the name of Clasara et al. (Publication No. US-2003-02 10498-A1); U.S. patent application Ser. No. 10/435,360 entitled "Method of Merging Two Disks Concentrically Without Gap Between Disks" in the name of Buitron (Publication No. US-2004-0016214-A1); U.S. patent application Ser. No. 10/434,551 entitled "Apparatus for Combining or Separating Disk Pairs Simultaneously" in the name of to Buitron et al. (Publication No. US-2004-0035737-A1); U.S. patent application Ser. No. 10/435,572 entitled "Method of Simultaneous Two-Disk Processing of Single-Sided Magnetic Recording Disks" in the name of Buitron et al. (Publication No. US-2003-0211275-A1); U.S. patent application Ser. No. 10/435,161 entitled "W-patterned Tools for Transporting/Handling Pairs of Disks" in the name of Buitron et al. (Publication No. US-2003-020942 1-Al); U.S. patent application Ser. No. 10/435,295 entitled "Method for Servo pattern application on Single-Side Processed Disks in a Merged State" in the name of Valeri (Publication No. US-2004-00,13011-A1); U.S. patent application Ser. No. 10/434,547 entitled "Method for Simultaneous Two-Disk Texturing" in the name of Buitron et al. (Publication No. US-2004-0070092-A1); U.S. Patent application Ser. No. 10/535,227 entitled "Cassette for Holding Disks of Multiple Form Factors" in the name of Buitron et al. (Publication No. US-2004-0069662-A1); U.S. patent application Ser. No. 10/434,546 entitled "Automated Merge Nest for Pairs of Magnetic Storage Disks" in the name of Croflon et al. (Publication No. US-2004-0071535-A1); U.S. patent application Ser. No. 10/435,293 entitled "apparatus for Simultaneous Two-Disk Scrubbing and Washing" in the name of Crofton et al. (Publication No. US-2004-0070859-A1); and U.S. patent application Ser. No. 10/435,362 entitled "Cassette apparatus for Holding 25 Pairs of Disks for Manufacturing Process" in the name of Buitron et al. (Publication No. US-2004-0068862-A1). Each of these applications is incorporated by reference in its entirety as if stated herein. All of these applications are commonly owned by the Assignee.

FIELD OF THE INVENTION

The present invention is directed to various apparatus and methods for handling pairs of disks for processing single-sided disks. More specifically, it relates to methods and apparatus employed in lubricating disks. Although, it should be understood that the present methods and apparatus for handling disk pairs is not limited to the lubrication process but can be utilized in most any context requiring movement or transfer of pairs of disks or multiple pairs of disks.

BACKGROUND OF THE INVENTION

Hard disk drives are an efficient and cost effective solution for data storage. Depending upon the requirements of the particular application, a disk drive may include anywhere from one to eight hard disks and data may be stored on one or both surfaces of each disk. While hard disk drives are traditionally thought of as a component of a personal computer or as a network server, usage has expanded to include other storage applications such as set top boxes for recording and time shifting of television programs, personal digital assistants, cameras, music players and other consumer electronic devices, each having differing information storage capacity requirements.

Typically, hard memory disks are produced with functional magnetic recording capabilities on both sides or surfaces of the disk. In conventional practice, these hard disks are produced by subjecting both sides of a raw material substrate disk, such as glass, aluminum or some other suitable material, to numerous manufacturing processes. Active materials are deposited on both sides of the substrate disk and both sides of the disk are subject to full processing such that both sides of the disk may be referred to as active or functional from a memory storage stand point. The end result is that both sides of the finished disk have the necessary materials and characteristics required to effect magnetic recording and provide data storage. These are generally referred to as double-sided process disks. Assuming both surfaces pass certification testing and have no defects, both sides of the disk may be referred to as active or functional for memory storage purposes. These disks are referred as double-sided test pass disks. Double-sided test pass disks may be used in a disk drive for double-sided recording.

Conventional double-sided processing of hard memory disks involves a number of discrete steps. Typically, twenty-five substrate disks are placed in a plastic cassette, axially aligned in a single row. Because the disk manufacturing processes are conducted at different locations using different equipment, the cassettes are moved from work station to work station. For most processes, the substrate disks are individually removed from the cassette by automated equipment, both sides or surfaces of each disk are subjected to the particular process, and the processed disk is returned to the cassette. Once each disk has been fully processed and returned to the cassette, the cassette is transferred to the next work station for further processing of the disks.

More particularly, in a conventional double-sided disk manufacturing process, the substrate disks are initially subjected to data zone texturing. Texturing prepares the surfaces of the substrate disks to receive layers of materials which will provide the active or memory storage capabilities on each disk surface. Texturing may typically be accomplished in two ways: fixed abrasive texturing or free abrasive texturing. Fixed abrasive texturing is analogous to sanding, in which a fine grade sand paper or fabric is pressed against both sides of a spinning substrate disk to roughen or texturize both surfaces. Free abrasive texturing involves applying a rough woven fabric against the disk surfaces in the presence of a slurry. The slurry typically contains diamond particles, which perform the texturing, a coolant to reduce heat generated in the texturing process and deionized water as the base solution. Texturing is typically followed by washing to remove particulate generated during texturing. Washing is a multi-stage process and usually includes scrubbing of the disk surfaces. The textured substrate disks are then subjected to a drying process. Drying is performed on an entire cassette of disk drives at a time. Following drying, the textured substrate disks are subjected to laser zone texturing. Laser zone texturing does not involve physically contacting and applying pressure against the substrate disk surfaces like data zone texturing. Rather, a laser beam is focused on and interacts with discrete portions of the disk surface, primarily to create an array of bumps for the head and slider assembly to land on and take off from. Laser zone texturing is performed one disk at a time. The disks are then washed again. Following a drying step, the disks are individually subjected to a process which adds layers of material to both surfaces for purposes of creating data storage capabilities. This can be accomplished by sputtering, deposition or by other techniques known to persons of skill in the art. Following the addition of layers of material to each surface, a lubricant layer typically is applied. The lubrication process can be accomplished by subjecting an entire cassette of disks to a liquid lubricant; it does not need to be done one disk at a time. Following lubrication, the disks are individually subjected to surface burnishing to remove asperities, enhance bonding of the lubricant to the disk surface and otherwise provide a generally uniform finish to the disk surface. Following burnishing, the disks are subjected to various types of testing. Examples of testing include glide testing to find and remove disks with asperities that could affect flying at the head/slider assembly and certification testing which is writing to and reading from the disk surfaces. Certification testing is also used to locate and remove disks with defects that make the surface unuseable for data storage. The finished disks can then be subjected to a servo-writing process and placed in disk drives, or placed in disk drives then subjected to servo-writing. The data zone texturing, laser zone texturing, scrubbing, sputtering, burnishing and testing processes are done one disk at a time, with each surface of a single disk being processed simultaneously.

Although the active materials and manufacturing processes, by their nature, are difficult and expensive to employ, over the years, the technology used to manufacture hard memory disks has rapidly progressed. As a result, the density of information that can be stored on a disk surface is remarkable. Indeed, double-sided test pass disks used in personal computers have much greater storage capacity than most consumers require during the useful life of the computer. Consumers thus are forced to pay substantial amounts for excess storage capacity and the components to access the excess storage capacity. This has caused some disk drive manufacturers, in some current applications, to manufacture and sell disk drives which utilize only one side of a double-sided test pass disk for storage purposes or which use the good side of a double-sided process disk where one surface passed certification testing and the second surface failed. In either case, the second surface, despite being fully processed, is unused. However, the disk drive manufacturer reduces its cost by eliminating the mechanical and electrical components needed to access the unused disk surface. These disk drives are referred to as single-side drives and are typically used in low-end or economy disk drives to appeal to the low cost end of the marketplace. Although this approach may reduce some cost, it does not reduce the wasted cost of manufacturing the unused storage surface of each disk. Thus, substantial savings can be achieved by not only manufacturing disks with a single active or functional side, but doing so in a cost-effective manner.

In contrast to a double-sided disk, a single-sided disk has only one functional memory surface with active recording materials. It is not a double-sided process disk where one side is not accessed or where one side has failed testing. Rather, manufacturing processes are applied in a controlled manner only to one side of the disk using unique single-sided processing techniques. In contrast to conventional double-sided disks, active recording materials are only applied to, and full processing is only conducted on, one side of the disk. Thus, substantial savings are achieved by eliminating processing the second side of each disk.

Additionally, the present invention achieves advantages by utilizing conventional double-sided disk manufacturing equipment and processes, with limited modification. The present invention enables simultaneous processing of two substrate disks through the same equipment and processes used to manufacture double-sided disks. Simultaneously processing two substrate disks results in the production of two single-sided disks in the same time and using essentially the same equipment as currently is used in the production of one double-sided disk. However, each single-sided disk has only a single active or functional surface. For illustrative purposes FIG. 1 shows a side-by-side schematic representation of the processing of one double-sided disk $D_d$, depicted on the left side of FIG. 1, versus the simultaneous processing of two single-sided disks $D_s$, depicted on the right side of FIG. 1. In each case, the double-sided disk or the two single-sided disks are subjected to the same process steps 1 through N, but the single-sided disk processing produces two disks in the same time the double-sided disk processing produces one disk.

A benefit provided by simultaneous single-sided processing of disks is a substantial cost savings achieved by eliminating the application of materials to and processing of one side of each disk. A further, and potentially significant cost savings can be achieved by utilizing existing double-sided disk processing equipment, with limited modification, to process pairs of single-sided disks. A still further benefit is a substantial increase in production (or reduction in processing time depending upon perspective). By utilizing existing double-sided disk processing equipment, approximately twice the productivity of a conventional double-sided production process is achieved (on the basis of numbers of disks produced) in the production of single-sided disks. Moreover, these increased productivity levels are achieved at approximately the same material cost, excepting the substrate disk, as producing half as many double-sided disks.

The simultaneous processing is achieved by combining two substrate disks together into a substrate disk pair or disk pair. A disk pair is two substrate disks that are oriented in a back-to-back relationship with the back-to-back surfaces either in direct physical contact or closely adjacent with a slight separation. The separation can be achieved with or without an intervening spacer. The substrate disk pair progresses through each process step in much the same way as one double-sided disk, but with only the outwardly facing surface of each disk in the pair being subjected to the full process. Thus, the outwardly facing surface of each pair becomes the active or functional surface and the inwardly facing surface of each pair remain inactive or non-functional.

For convenience and understanding, the following terms will have the definitions set forth:

a) "R-side" and "L-side" refer to the active side and inactive side of a disk, respectively. R-side is the side that does or will have active recording materials and memory capability. The R-side may also be referred to as the active or functional side. The L-side is the side that has little or no active recording materials or memory capabilities; it is non-functional or inactive from a data storage stand point.

b) "Merge" means to bring two disks closer together to form a pair of disks, a disk pair or a substrate pair.

c) "Demerge," conversely, means that a merged pair of disks is separated from each other.

d) "Disk" means a finished memory disk and all predecessor configurations during the manufacturing process starting with a substrate disk and progressing to a finished memory disk, depending upon the context of the sentence in which it is used.

e) "Disk pair" or "substrate pair" means two disks positioned in contact merge, gap merge or spacer merge orientation.

f) "Double-sided disk" means a single disk which has been subjected to double-sided processing, whether or not both sides of the disk have passed testing or only one side has passed testing.

g) "Gap merge" means a pair of disks that have been merged, but a space is maintained between the two merged disks. One or more spacers may or may not be used to maintain the gap or space. Gap merge includes both concentric and non-concentric merge. It should be understood that there is no precise dimension or limit to the space between the disks that causes them to be gap merged. Gap merge also includes the situation where the gap between the disks gradually decreases from one perimeter edge to the opposite perimeter edge of the disks when the two disks are angled toward each other. An example is when the bottom perimeter edges of the disks are spaced apart and the upper perimeter edges are in contact.

h) "Single-sided disks" means a single disk which has been subjected to single-side processing, where only one surface of the disk is filly processed.

i) "Spacer merge" means a spacer body is used to create spacing between two gap-merged disks.

j) "Contact merge" means a merged pair of disks where the inside surface of each disk is in contact with the inside surface of the other disk. Contact merge includes concentric and non-concentric merge.

k) "Concentric merge" means that two merged disks have the same axis and, assuming the two disks have the same outside diameter and inside diameter (as defined by the center aperture), their outer and inner perimeter edges are aligned.

l) "Concentric contact merge" means a pair of disks that are oriented in both a contact merge and a concentric merge.

m) "Non-concentric merge" or "off-centered merge" means the two merged disks are not concentric to each other or their perimeter edges are not aligned.

n) "Non-concentric contact merge" means the two contact merged disks are not concentric to each other or their perimeter edges are not aligned.

Referring to FIG. 2, a cross-section of a pair of gap-merged disks is shown. The R-side (active or functional side) is the outwardly facing surface R of each disk within the pair. The L-side (inactive or nonfunctional side) is the inwardly facing surface L of each disk within the pair. In comparison, a cross-section of a pair of concentric contact merged disks is shown in FIG. 3. The relative orientation of the R-side and L-side of each disk remains the same, however, the L-side of each disk of the pair are in contact and the outer and inner perimeter P of each disk is aligned with the outer and inner perimeter P of the other disk.

A conventional double-sided disk is shown in FIG. 4. The left side surface is referred to as the "A" side and the right side surface is referred to as the "B" side. Both the A and B sides are subjected to processing, including the addition of active or magnetic materials. In contrast, with reference to FIGS. 2 and 3, the R-side of each disk in a pair of disks is oriented on the outside of the pair and is subjected to processing in the same fashion as the A and B sides of a double-sided disk. Conversely, the L-side of each disk in a pair of disks is oriented on the inside of the pair and is not subjected to full processing in the same fashion as the A and B sides of a double-sided disk.

SUMMARY OF THE INVENTION

These and other benefits are addressed by the various embodiments and configurations of the present invention. For example, a benefit provided by the present invention is an increased output in the production of finished disks achieved by lubricating multiple pairs of single-sided disks simultaneously. Another benefit is that, with limited modifications, the present invention can utilize existing processing equipment originally designed and built to lubricate double-sided disks for the processing of pairs of single-sided disks. By utilizing existing lubricating equipment, designed for example to lubricate 25 double-sided disks simultaneously, the present invention can lubricate 25 pairs of disks simultaneously. This is a one-hundred percent increase in the volume of disks lubricated compared to conventional double-sided disk lubrication. It also results in substantial capital equipment savings which would otherwise be spent modifying existing equipment or creating new equipment for lubricating single-sided disks when such expenditures are unnecessary given the fact that much of the existing equipment will work.

The present invention is generally directed to methods and apparatus for lubricating the surfaces of at least one pair of single-sided disks simultaneously. In one embodiment, a cassette containing a plurality of pairs of disks is positioned at a lubricating workstation. Although the orientation of the disks in the cassette is generally unimportant, in the preferred embodiment the sputtering process will likely precede the lubrication process and the disks will likely exit the sputtering process as pairs of disks in a gap merge orientation. A mandrel is inserted through the center aperture of all of the disks in the cassette. The mandrel has at least one row of teeth along its length to engage and maintain separation of the disks. Because the orientation of the disks in the cassette is known, the mandrel is selected to complement the orientation of the disks. Therefore, the mandrel is aligned relative to the known orientation of the disks such that at least one tooth on the mandrel is positioned between every disk and the next adjacent disk.

The mandrel engages and removes the disks from the cassette and places them in a lubrication tank. The tank may either be filled with lubricant before the disks are transferred into the tank or, after the disks are transferred to the tank, lubricant is added. After appropriate processing time has passed, the lubricant is drained from the tank or the disks are removed from the tank, leaving the lubricant in the tank. The disks are then returned to a cassette in order that they may be transferred to another station for subsequent processing.

In the preferred embodiment, the mandrel used for transporting the disks is configured to orient the disks with equal spacing between the disks. The mandrel converts the gap merge orientation of the disks as resident in the cassette into an orientation of equal spacing on the mandrel. Equal spacing is desired to ensure the lubricant fully coats both surfaces of each disk and to avoid the negative effects associated with capillary action of the lubricant as it drains from between the disks following lubrication. In the first instance, depending upon the size of the gap between the disks, lubricant may not fully penetrate the space between the L-side surfaces of each pair of disks. The viscosity of the lubricant can also affect this problem. In the latter instance, as the lubricant drains from between the disks, the capillary action will tend to pull adjacent disks together and into contact. The closer the disks are to each other, the more pronounced this problem is. Thus, when disks are in a gap merge orientation with a gap of between approximately 0.025 and 0.035 inches, capillary action or wicking of the lubricant can occur. If one or more pairs of disks are pulled into contact, the disks may become misaligned and create a jam or fouling of disks upon their attempted return to a cassette. This may also create lubricant puddles at the contact points which can cause non-uniformity of the lubricant on the disk surfaces. In other words, the lubricant may be too thick in some spots. In turn, this can create problems in the subsequent burnishing process.

These problems can be reduced by positioning the disks on the lubrication mandrel with adequate and equal spacing between the disks. Thus, in the preferred embodiment, the mandrel is designed to reposition the disks from gap merge orientation to an orientation of equal spacing among the disks. However, a mandrel which positions the disks in gap merge orientation can succeed as well. Care should be taken to ensure that the disks cannot freely swing on the mandrel, which will inhibit the effects of the capillary action of the lubricant. Also, the viscosity of the lubricant and spacing between the disks can be monitored and adjusted if necessary.

Following lubrication, the disks are transferred from the mandrel to a cassette. The cassette delivers the disks to the next processing station. Therefore, depending upon the desired orientation of the disks for the process following lubrication, the disks may be further reoriented following lubrication to position the disks in the desired orientation for the next process. For example, if tape burnishing is the process which follows lubrication, it may be desirable to have the disks in a concentric contact merge orientation, which is the preferred orientation used for tape burnishing. Therefore, it would be most efficient to place the disks in a contact merge orientation following lubrication. This may be accomplished by use of an appropriately designed and configured cassette. A description of such a cassette, as well as cassettes of other configurations, is found in co-pending U.S. patent application Ser. No. 10/435360 entitled "Method of Merging Two Disks Concentrically Without Gap Between Disks" in the name of Buitron (Publication No. US-2004-016214-A1); co-pending U.S. patent application Ser. No. 10/535,227 entitled "Cassette for Holding Disks of Multiple Form Factors" in the name of Buitron et al. (Publication No. US-2004-0069662-A1); and, co-pending U.S. patent application Ser. No. 10/434,546 entitled "Automated Merge Nest for Pairs of Magnetic Storage Disks" in the name of Crofton et al. (Publication No. US-2004-0071535-A1), all filed May 9, 2003, the entirely of which are incorporated herein by reference as if stated herein. All of these applications are commonly by the Assignee.

Concerns of disk stability during transport by the mandrel or during tank draining are addressed by the configuration of the mandrel. In one embodiment, the mandrel is designed to contact each disk at three points. Thus, the mandrel has three rows of teeth along its length to engage each disk at three points. Compared to a two-point or one-point contact mandrel, a three-point contact mandrel provides increased stability to the disks during transport and reduces the likelihood of disks becoming dislodged and falling from the mandrel. The additional stability of the disks also helps to counteract the effects of capillary action during tank fill and/or draining and reduces or eliminates these problems as well.

It should be appreciated that the mandrel may be sized to transport any number of pairs of disks. The mandrel may transport one or more pairs of disks. While it is most efficient to lubricate all of the disks from a cassette simultaneously, the present invention may also be used to lubricate less than all the disks in a cassette simultaneously, from as few as one pair (2 disks) to as many pairs as contained in the cassette.

The above-described embodiments and configurations are not intended to be complete nor exhaustive. As will be appreciated, other embodiments of the invention are possible utilizing, alone or in combination, one or more features set forth above or described below.

BRIEF DESCRIPTION OF THE DRAWINGS

FIG. 1 is a schematic of a double-sided disk manufacturing process, on the left, and a schematic of a single-sided disk manufacturing process, on the right.

FIG. 2 is a cross-section of a pair of gap merge disks.

FIG. 3 is a cross-section of a pair of concentric contact merge disks.

FIG. 4 is a cross-section of a conventional double-sided process disk.

FIG. 8 is a perspective view of one embodiment of the mandrel of the present invention holding a plurality of gap merge pairs of disks above a cassette.

FIG. 9 is a front elevation view of the embodiment of FIG. 8.

FIG. 10 is a side view of the embodiment of FIG. 8 taken along line 10—10 of FIG. 9, but showing a different cassette embodiment in cross-section.

FIG. 24 is a top elevation view of a base wall member of the cassette of FIG. 20.

FIG. 25 is an end elevation view of the base wall member shown in FIG. 24.

FIG. 26 is a front elevation view of the embodiment shown in FIG. 24.

FIG. 27 is a top elevation view of a side wall member of the cassette shown in FIG. 20.

FIG. 28 is an enlarged view of a portion of the side wall of FIG. 27.

FIG. 29 is an end elevation view of the embodiment shown in FIG. 27.

FIGS. 30A, B and C are a sequence of partial top elevation views showing a pair of disks interacting with adjacent ribs of the side wall member of the cassette of FIG. 20.

FIGS. 31A, B and C are a sequence of partial front elevation views corresponding with FIGS. 30A, B and C.

It should be understood that the drawings are not necessarily to scale. In certain instances, details which are not necessary for an understanding of the invention or which render other details difficult to perceive may have been omitted. It should be understood, of course, that the invention is not necessarily limited to the particular embodiments illustrated herein.

DETAILED DESCRIPTION OF THE PREFERRED EMBODIMENT

Figure 5:
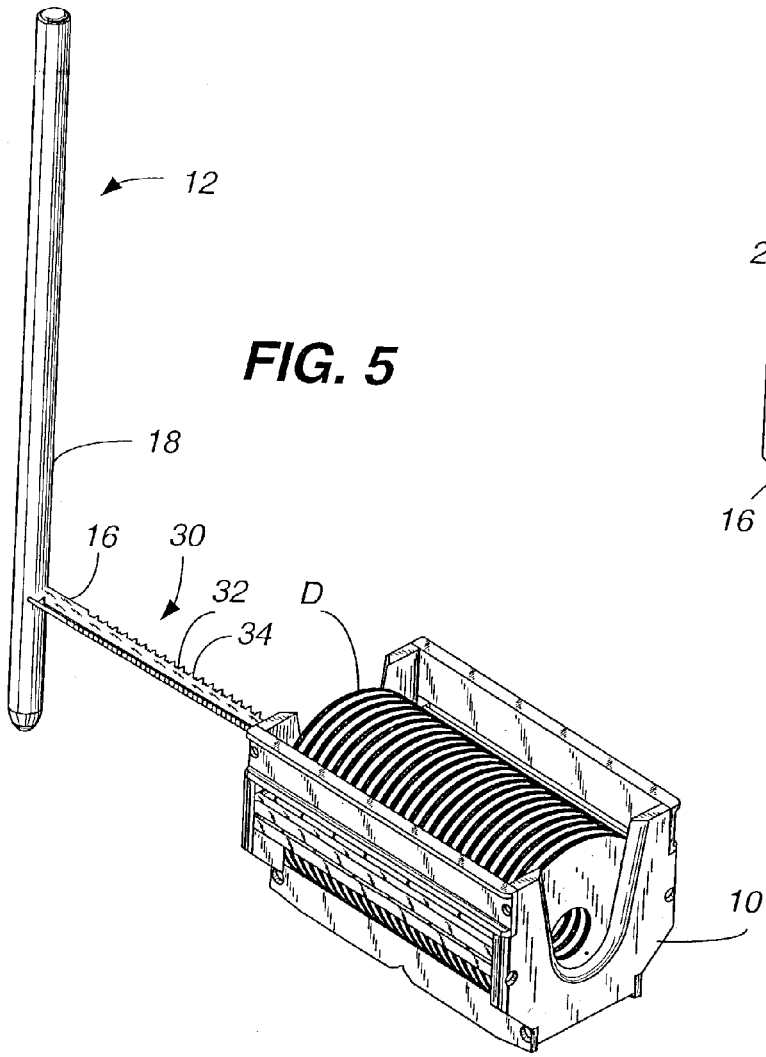
FIG. 5 is a perspective of one embodiment of the mandrel of the present invention prior to insertion through the center aperture of a plurality of gap merge disks in a cassette.

At some point during the manufacture of hard memory disks, the disks are subjected to a lubrication station. FIG. 5 shows a single row of disks D axially aligned in a cassette 10 or other suitable container. Although the disks are illustrated in a gap merge orientation, they could be equally spaced within the container or in some other orientation. As the lubrication process typically follows sputtering, the disks would likely exit the sputtering process in either a gap merge orientation or in an orientation with some space between the disks. This is because the sputtering process subjects the disks to significantly elevated temperatures which could cause the disks to physically weld themselves together if they were in contact. In the preferred embodiment, the disks will arrive at the lubrication station in pairs, with the pairs in a gap merge orientation. The gap spacing may vary depending upon the thickness and size of disks as would be appreciated by a person of skill in the art. In the context of 95 millimeter diameter disks having a 0.050 inch thickness, the gap between a pair of disks in gap merge orientation is preferably between 0.025 inches to 0.035 inches, although this dimension may vary from this range. With disks of this size, a gap space in this range allows pairs of disks to utilize disk manufacturing equipment designed and configured for handling one double-sided disk with limited, if any, modifications. The spacing between adjacent pairs of disks where each pair of disks is in a gap merge orientation can be between 0.085 and 0.130 inches.

Figure 7:
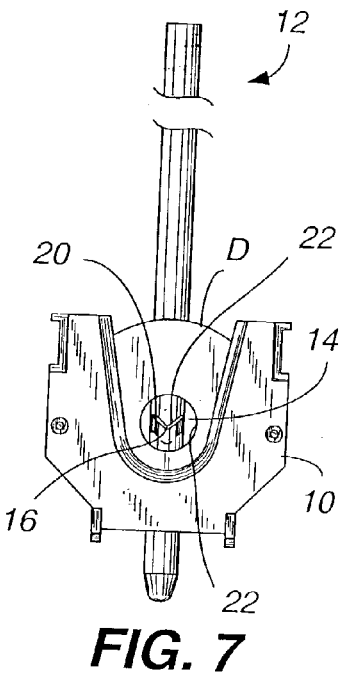
FIG. 7 is a front elevation view of the embodiment of FIG. 5.
Figure 6:
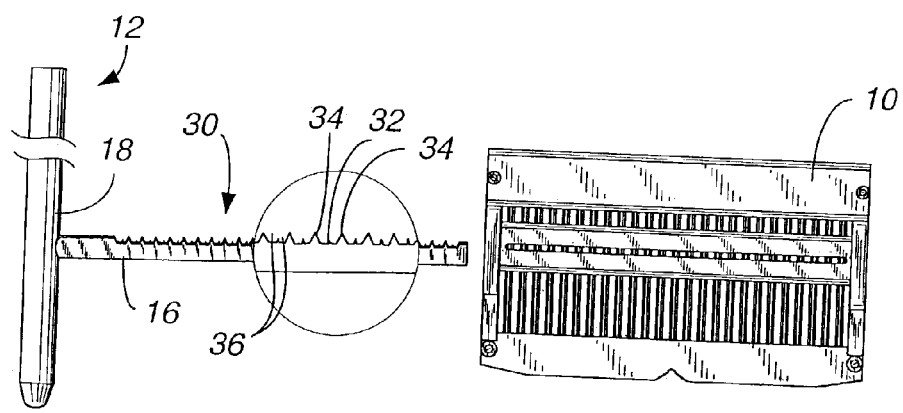
FIG. 6 is a side elevation view of the embodiment of FIG. 5, further magnifying a portion of the mandrel.

A mandrel 12 engages all of the disks D in a cassette 10 via the center aperture 14. As shown in FIGS. 5–7, one embodiment of the mandrel 12 comprises an elongate member 16 extending from a support post 18. The elongate member 16, shown in FIGS. 7 and 9, is M-shaped to provide two contact points 20 and 22 with the interior edge 24 of the disks. The two side walls 26 and 28 of the elongate member provide structural rigidity. Alternatively, as shown in FIGS. 5 and 6, the elongate member 16 may be V-shaped by eliminating the two side walls. In either case, the two contact points 20 and 22 remain. The elongate member 16 is preferably disposed at an upwardly inclined angle from the main support post. The preferred angle of incline is approximately two degrees above horizontal. The inclined angle helps reduce lubrication ripples on the surfaces of the disks which can occur during draining of the lubricant from the tank or removal of the disks following lubrication.

As seen in FIGS. 5 and 6, a row of teeth 30 are disposed on the upper two edges of the mandrel with each row comprising a small tooth 32 disposed between a pair of larger teeth 34. This arrangement of teeth maintains a gap merge orientation of the disks. As shown in FIGS. 5–10, the elongate portion 16 of the mandrel 12 is inserted through the center aperture 14 of the disks and accurately positioned such that the two rows of teeth 30 align with the spaces between the disks. More specifically, there is a larger space between pairs of disks than between the two disks of each pair. The small teeth are aligned with the gap formed between the disks comprising each pair and the large teeth are aligned with the space between each pairs of disks. Once fully and accurately positioned inside the apertures of the disks, the mandrel 12 raises until the interior edge 24 of each disk is positioned in the channel 36 formed between the successive teeth 30. As shown in FIG. 8, further lifting raises the disks from the cassette 10. The pairs of disks shown in FIGS. 5, 6, 8 and 10 are in a gap merge orientation (see FIG. 2.)

Figure 11:
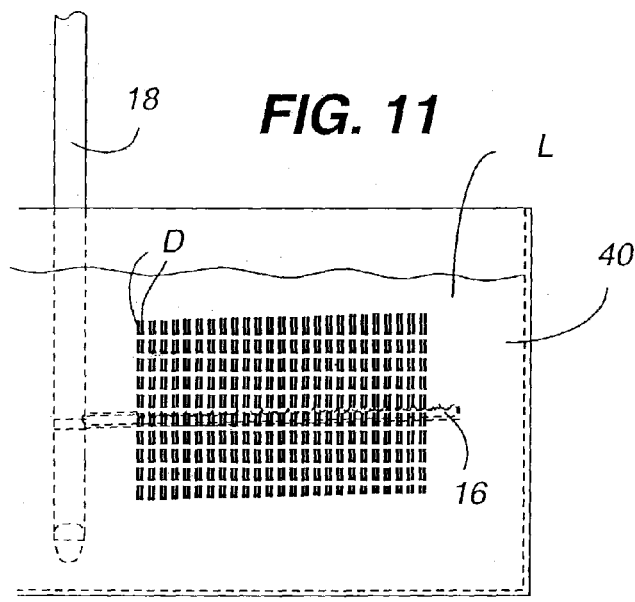
FIG. 11 is a side elevation view of a plurality of pairs of gap merge disks seated on a mandrel and positioned in a lubrication tank.
Figure 12:
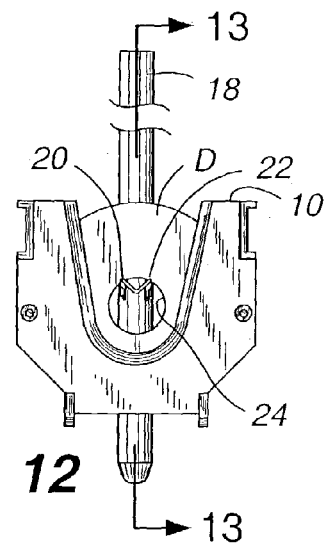
FIG. 12 is a front elevation view of one embodiment of the mandrel in the present invention, returning a plurality of lubricated disks to a contact merge cassette.
Figure 13:
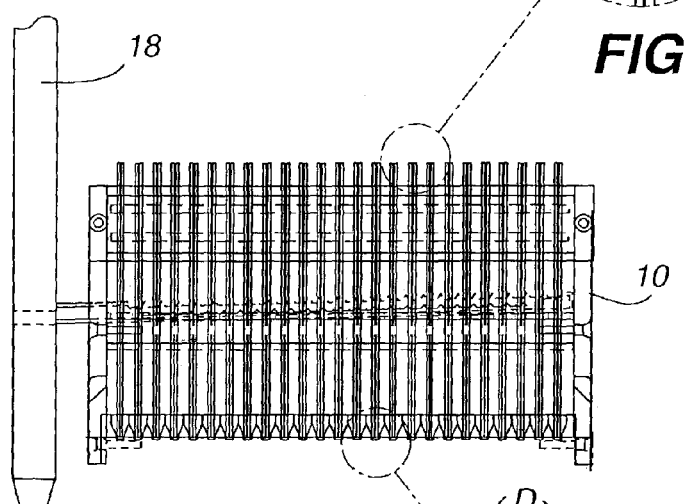
FIG. 13 is a cross-section view of the embodiment shown in FIG. 12 taken along line 13—13 of FIG. 12.

The mandrel 12 then moves to a position above a lubrication tank 40 and lowers itself and the disks into the tank. In the preferred embodiment, lubricant L then fills the tank until the disks are completely submerged (FIG. 11). After an appropriate amount of time passes, the lubricant is removed from the tank 40 and the mandrel 12 lifts the now lubricated disks out of the tank. In the preferred embodiment, the mandrel then moves to a second position at the lubrication workstation and returns the disks to a cassette as shown in FIGS. 12 and 13. As addressed below, a variety of different cassettes could be used to receive the lubricated disks. For optimum efficiency, the disks should be transferred to a cassette configured to position the disks in the orientation needed for the next process. Depending upon the orientation desired for subsequent processing, the cassettes could be configured to position the disks in a contact merge orientation, gap merge orientation or some other orientation. Of course, the disks may also be returned to the cassette in which they arrived. As should also be appreciated, multiple mandrels working in cooperation with multiple lubrication tanks can be employed simultaneously to increase throughput of the system.

A typical lubricant is perfluoropolyethers (PFPE). With this lubricant, and with 95 millimeter diameter disks having a 0.050 inch thickness, the disks remain in the lubricant for approximately 30 to 120 seconds. The type of lubricant and length of time the disks are exposed to the lubricant may also vary depending upon the desired final lubrication on the disks and the size of the disks. As the lubricant drains from the tank, a layer of lubricant remains on the surfaces of the disks. The layer of lubricant will primarily provide lubrication to the disks and serves as protection for the disk surfaces during operation of the disk drive. However, it can also advantageously act as an adhesive on the L-side of disk pairs to maintain a contact merge orientation between pairs of disks during subsequent processing. Tape burnishing or testing are examples of potential subsequent processing which could require contact merge orientation where the adhesive characteristics of the lubricant may be advantageously used.

As should also be appreciated, lubricant may be added to the tank following placement of the disks in the tank, or the lubricant may be present before the disks are added. If the liquid is in the tank when the disks are added, the rate at which the disks descend into the liquid should be controlled to prevent the liquid from dislodging one or more disks from the mandrel or from unintentionally merging pairs of disks into a contact merge orientation. If a pair of disks were to shift into a contact merge orientation upon entry into the lubricant, the contact orientation may prevent lubricant from contacting all or part of the contacting surfaces of the disks.

As discussed above, the cassette for receiving the now lubricated disks may vary, depending upon the subsequent processing for the disks. In the preferred embodiment, the post-lubrication disk receiving cassette will be configured for concentric contact merge orientation of the disks because the next process would typically be tape burnishing, which is optimally performed on concentric contact merged disks. Although the concentric contact merge orientation may be accomplished at the tape burnishing station rather than at the lubrication station, it is more efficient to place the disks in a concentric contact merge orientation when returning them to a cassette following lubrication, rather than repositioning the disks again at the tape burnishing station. Therefore, the post-lubrication receiving cassettes should be configured to position the disks in the orientation required by the next process.

Figure 16:
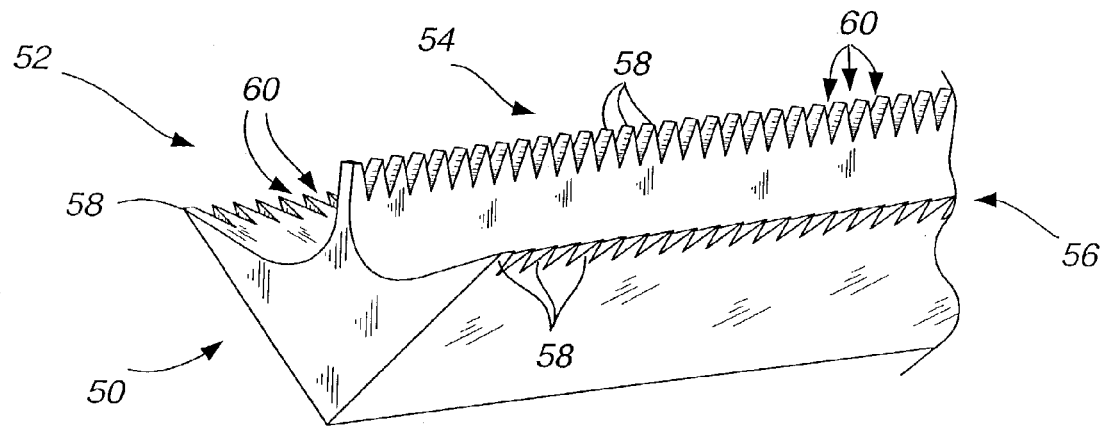
FIG. 16 is a partial perspective view of a second embodiment of the mandrel of the present invention.
Figure 17:
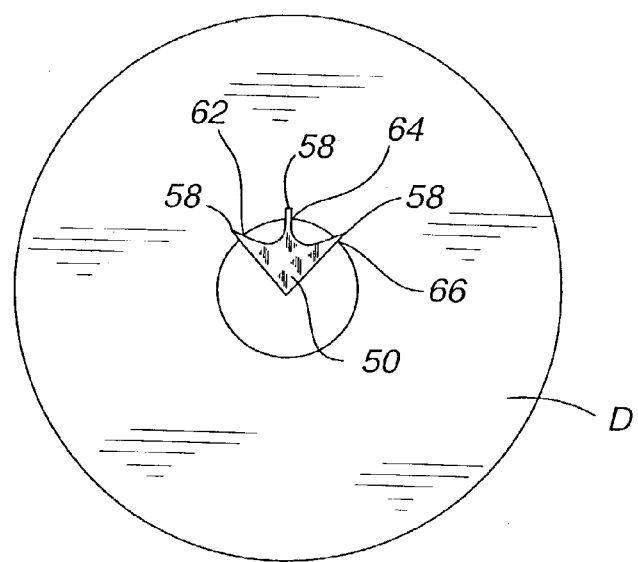
FIG. 17 is a front elevation view of the mandrel of FIG. 16 engaging a disk.
Figure 18:
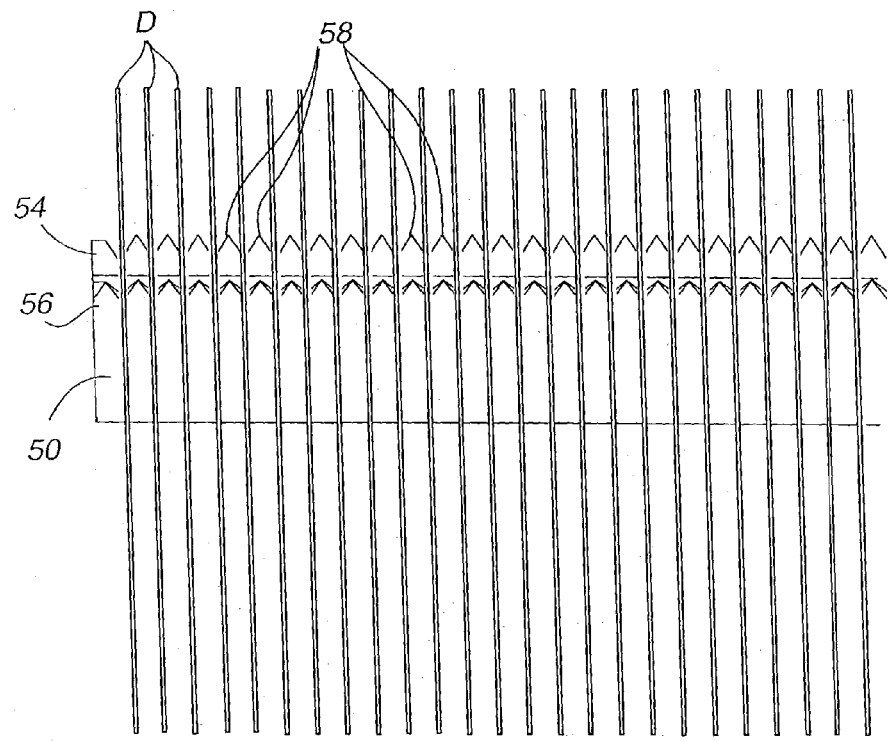
FIG. 18 is a side elevation view of a plurality of evenly spaced disks seated on the mandrel of FIG. 16.

An alternative to the V or M-shaped mandrel design is a three-prong mandrel design shown in FIGS. 16–19. The three-prong mandrel 50 applies equal contact pressure at three different contact points along the inner circumference of a disk as opposed to two-prong mandrel designs. The three-pronged mandrel 50 may be configured to create equal spacing between the disks, a gap merge orientation, or any other desired orientation. As previously mentioned, when disks are closely spaced on a mandrel, a capillary action or wicking can occur between disks, particularly if the disks are in closely spaced pairs in a gap merge orientation. This phenomenon is based upon how closely adjacent disks are positioned to each other, not whether the disks are in a gap merge or equal spacing orientation. Therefore, for at least the lubrication process, it is believed that an orientation of equally spaced disks is preferred over a gap merge orientation. The embodiment illustrated in FIG. 18 is configured for equal spacing between disks. In the case of 95 millimeter diameter disks having a 0.050 inch thickness, the space between each disk as shown in FIG. 18 is approximately 0.075 inches.

Figure 19A:
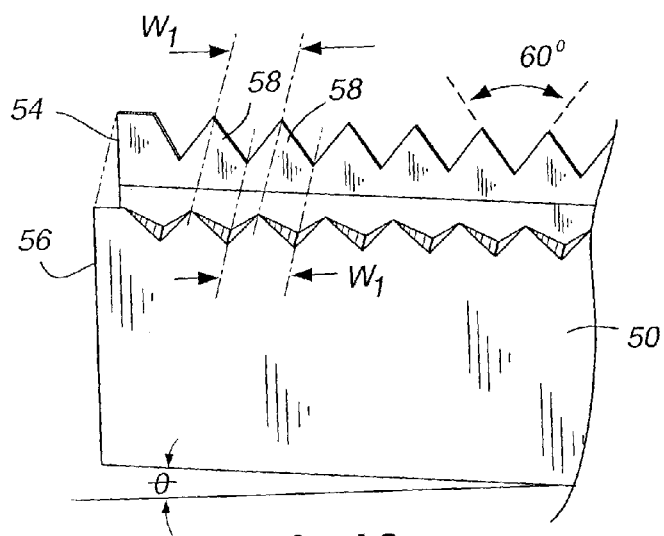
FIG. 19A is a partial perspective view of the distal end of the mandrel of FIG. 16.

As shown in FIGS. 16, 17, the three-pronged mandrel 50 has three rows of teeth 52, 54, 56. The teeth 58 are created by V-shaped notches 60. When handling disks having a 0.050 inch thickness, the distance $W_1$ between the apex of adjacent teeth 58 (or between the apex of adjacent notches), as shown in FIG. 19A, is preferably 0.125 inches. It should be appreciated that the notches 60 or teeth 58 may be cut in different sizes to accommodate different thickness disks. The notches are formed on each of three rows 52, 54, 56 of the mandrel 50 to match the inner diameter radius of the disk as shown in FIG. 17. This creates three contact points, 62, 64, and 66 on the disk, rather than two contact points created with a V or M shaped mandrel. In one embodiment, the outer rows of teeth 52 and 56 are formed at a forty-five degree angle relative to the middle row 54. The mandrel is preferably disposed at an angle θ, shown in FIG. 19A, preferably approximately two degrees. This helps reduce ripples of lubricant forming on the disk surfaces when the lubricant drains from the disks. The preferred angle of each notch 60 is 60 degrees as shown in FIG. 19A. The angle of the notch can also be altered to complement a chamfer formed on the inside edge of the disk at the central aperture. For example, the chamfer angle and notch angle can both be formed at sixty degrees to give enhanced stability to the disks.

Figure 19B:
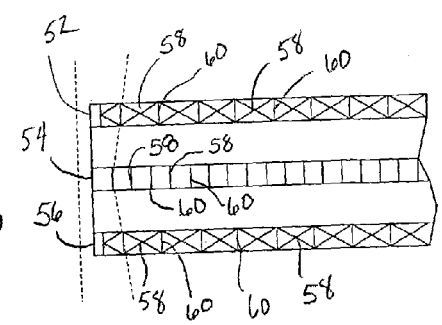
FIG. 19B is a top view of the embodiment of FIG. 19A.
Figure 20:
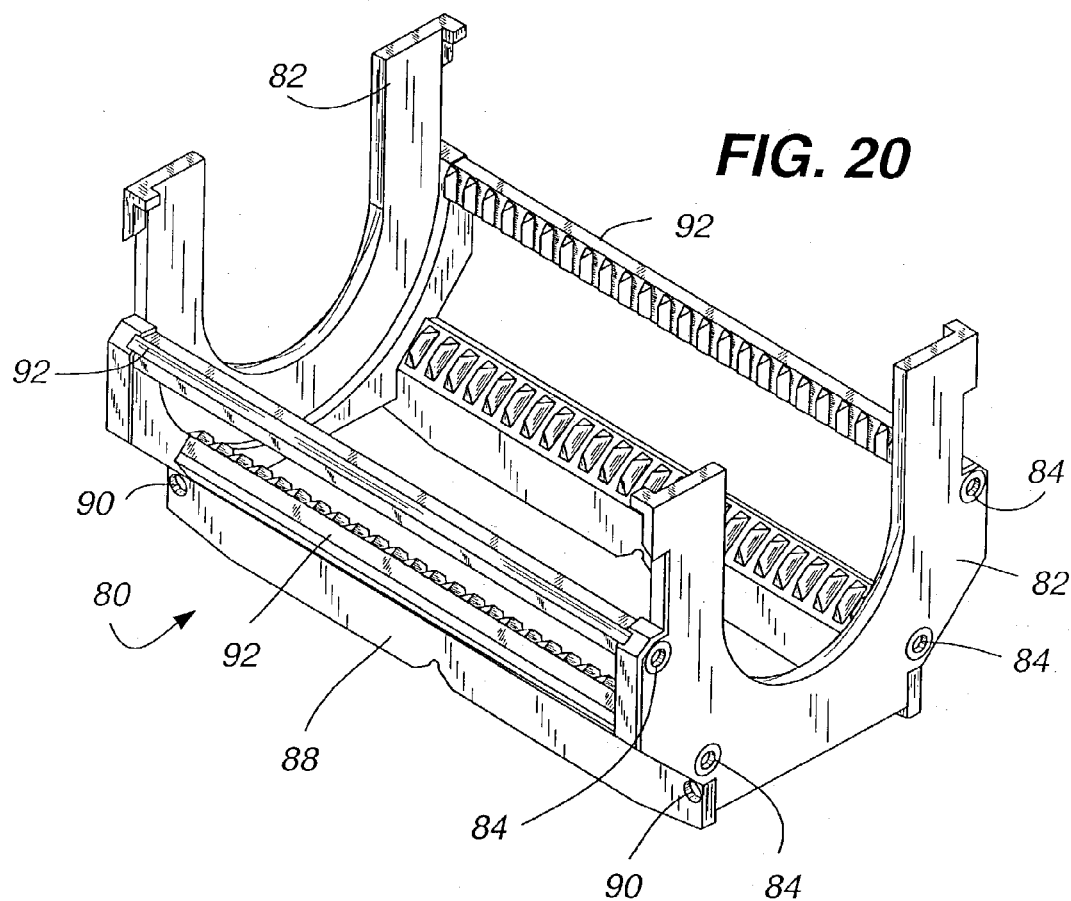
FIG. 20 is a perspective of one embodiment of a modular cassette configured for concentric contact merge orientation of disk pairs.
Figure 21:
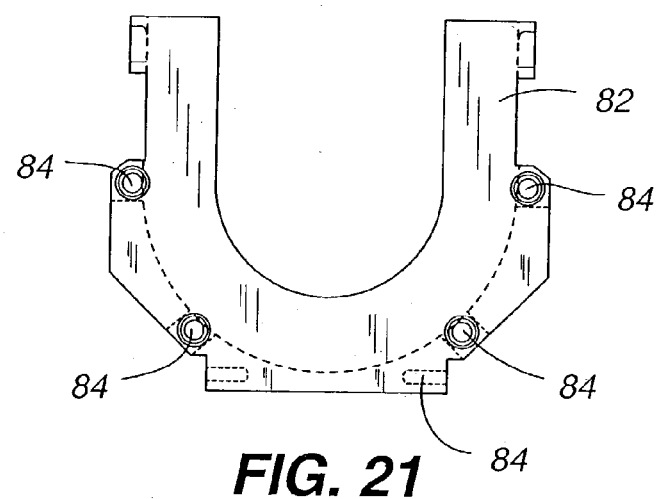
FIG. 21 is an end view of the cassette of FIG. 20.
Figure 23:
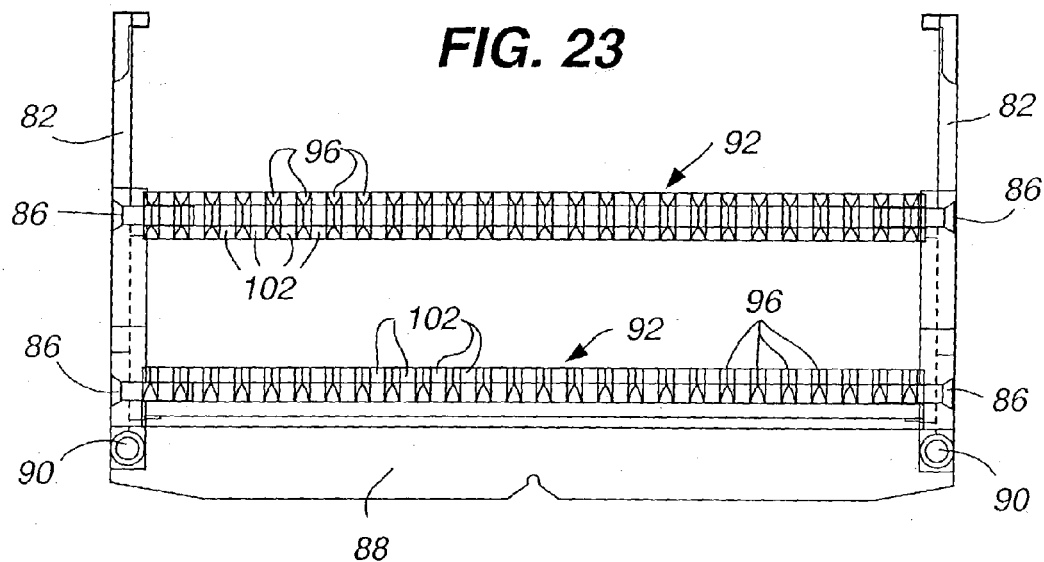
FIG. 23 is a cross-section of the cassette of FIG. 20 taken along line 23—23 of FIG. 22.
Figure 22:
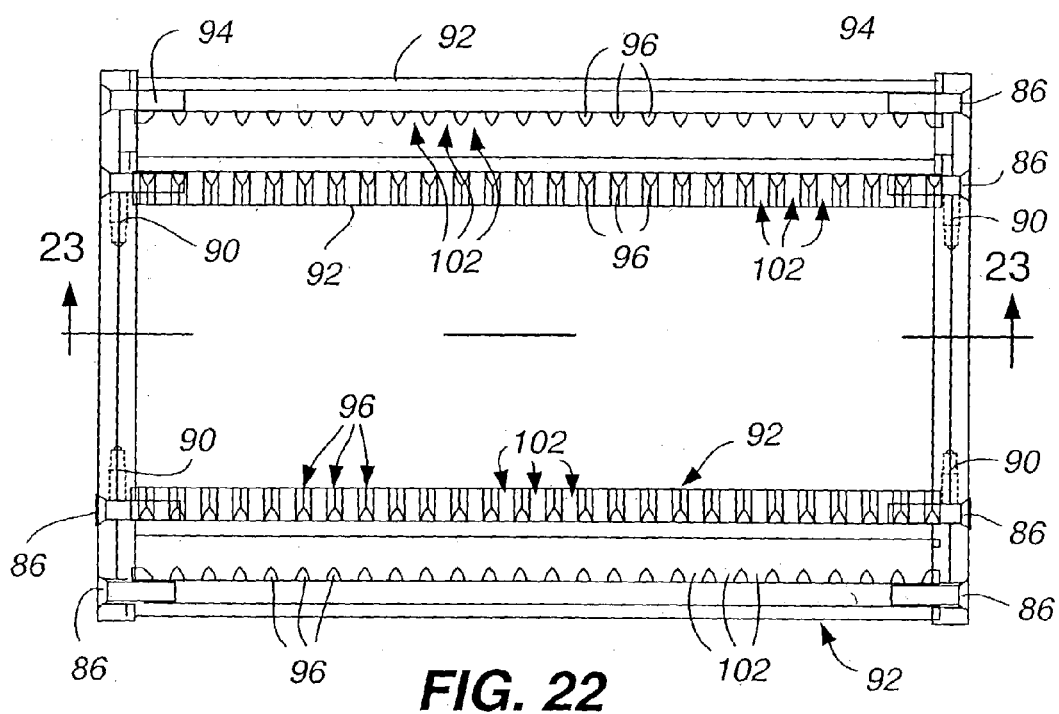
FIG. 22 is a top view of the cassette of FIG. 20.

Because of the incline or tilt angle of the mandrel, in order to maintain vertical orientation of the disks on the mandrel, the center row of teeth 54 must be slightly forward of the outer rows of teeth 52, 56. This is seen in FIG. 19B. In addition, for optimum stability, the notches on all three rows of teeth should be rotated forward, relative to the mandrel, by the same angle as the tilt angle. The tilt angle can be between 0.5 and 10 degrees above horizontal.

In the two-blade configuration, the disks are more susceptible to swinging on the mandrel 12 and potentially dislodging and falling. The added third or center row of teeth 54 in the three-prong mandrel 50 inhibits disk swing and reduces the risk of the disks coming into contact with each other during processing by more rigidly securing the disks on the mandrel. The more rigid design geometry of three-point contact also inhibits disk attraction due to the capillary action created as the lubricant drains away from between the disks.

Following lubrication, the newly lubricated disks are returned to a cassette. As previously mentioned, the post-lubrication cassette may be configured to hold the disks in any desired orientation. As the next process following lubrication is typically tape burnishing, in which the disk pairs are preferably in concentric contact merge orientation, the post-lubrication cassette is preferably configured to position the disk pairs in a concentric contact merge orientation.

Turning to FIGS. 20–29, one embodiment of a post-lubrication disk receiving cassette 80 is shown. The disk cassette 80 comprises eight pieces. These include two end walls 82 with six apertures 84 for receiving securing elements 86, two base members 88 which interconnect the two end walls 82 and are secured to the end walls through apertures 90 which align with securement apertures 84 in the end walls 82, and four side walls 92 which also interconnect the end walls 82 and are secured to the end walls 82 through similar securement apertures 94. In the preferred version of this embodiment, the four side walls 92, the two end walls 82 and the two base members 88 are identical. This provides modularity and interchangeability. For example, the interchangeability allows the disk manufacturer to maintain an inventory of the side walls 92 to replace individual side walls damaged or worn out during use. The modularity allows side walls configured to hold disks in different orientations to be substituted for each other. Thus, in one embodiment the cassette may be configured to hold disks in a contact merge orientation, and in another embodiment the side walls may be substituted for side walls to hold the disks in a gap merge orientation.

The cassette 80 and its component pieces are preferably made of plastic by injection molding processes. Different plastics, having different characteristics, can be selected depending upon the environment in which the cassette will be used. In typical environments such as texturing, cleaning, lubricating, servo writing, testing and general handling of disks around the manufacturing facilities, the plastic may be polyethylene terephthalate (PET) or polyesteresterketone (PEEK). Each provides good abrasion characteristics, although PEEK has the best abrasion characteristics and can withstand higher temperatures. Other acceptable plastics include polybutylene terephthalate (PBT), which is easier to mold, but has worse abrasion characteristics. It would also be possible to cast, forge, etch or machine the component pieces from metal, although the cost would likely be prohibitive.

As illustrated in FIG. 29, the side walls 92 may have an octagonal cross-sectional shape. A row of teeth 96 is disposed along one side of the side wall for engaging disks, as is shown in FIGS. 20, 22, 23 and 27. In this embodiment, the teeth 96 have two side surfaces 98, 100 which form channels or grooves 102 for receiving the disks. The grooves 102 are designed to position the pairs of disks in concentric contact merge orientation. The two surfaces 98, 100 are formed at different angles. As shown in FIG. 28, the lower side walls 98 form a first angle of 90 degrees. The 90 degree angle of the lower side walls 98 complement the chamferred outer edges of disks, formed at 45 degrees. These angles may change to accommodate different chamfers. The upper side wall 100 forms an angle of 60 degrees. The 60 degree angle formed by the upper side walls 100 creates a funnel-like opening that facilitates merging of a pair of gap merge disks to a pair that is in a contact merge orientation. These angles may also change to accommodate different sized disks. The upper side walls 100 of each tooth 96 also converge to create a ridge line 104 which forms the apex of each tooth. Each tooth also has an angled front and rear surface 106. The width of the flat base portion 108, together with the incremental additional width provided by the angle of the lower side walls 98, correspond to match the thickness of two disks. Thus, each pair of adjacent teeth 92 hold a disk pair in concentric merge.

The merging of pairs of disks by the configuration of the side walls of a cassette is illustrated in FIGS. 30 and 31. For simplicity in illustration, the side walls of the teeth 96 are depicted as only having one surface 100. Lower surface 98 is not shown. FIG. 30 is a top view, looking down from the top of a cassette at the perimeter edge of a pair of disks D. The chamfer of the disks is designated C in the figures. FIG. 31 is a front view showing the disks moving vertically downwardly into a cassette with teeth 96 positioned behind the disks. The distance $W_2$, shown in FIG. 30A, between the ridge line 104 of two adjacent teeth, is designed to be wider than the thickness of two disks in a gap merge orientation. Thus, if the disks are 0.050 inches thick and the gap is 0.035 inches thick, the distance $W_2$ should be 0.135 inches or wider.

In operation, the inwardly angled surfaces 100 facilitate movement of the disks toward each other as the disks are lowered into the cassette and contact the surfaces 100. Thus, as the mandrel 12 or 50 lowers the lubricated disks into the cassette 80, the side walls 100 of each side wall 92 act to force the disks together. The disks will slowly move into a concentric contact merge orientation, shown in FIGS. 30C and 31C, as they are lowered into the cassette. Once the disks become fully seated in the cassette, the mandrel can be withdrawn from the center apertures of the disks.

Figure 32:
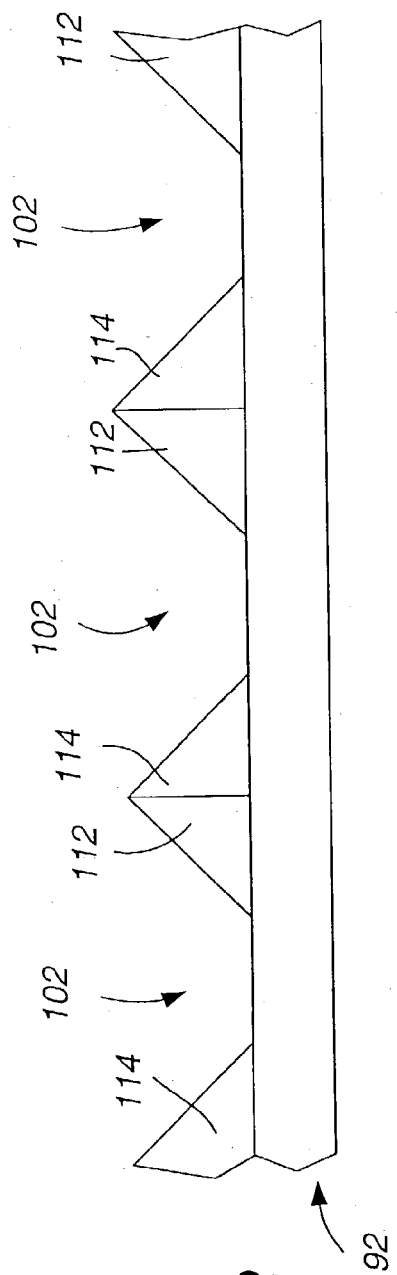
FIG. 32 is a top elevation view of a second embodiment of the side wall member of the cassette shown in FIG. 20.
Figure 33:
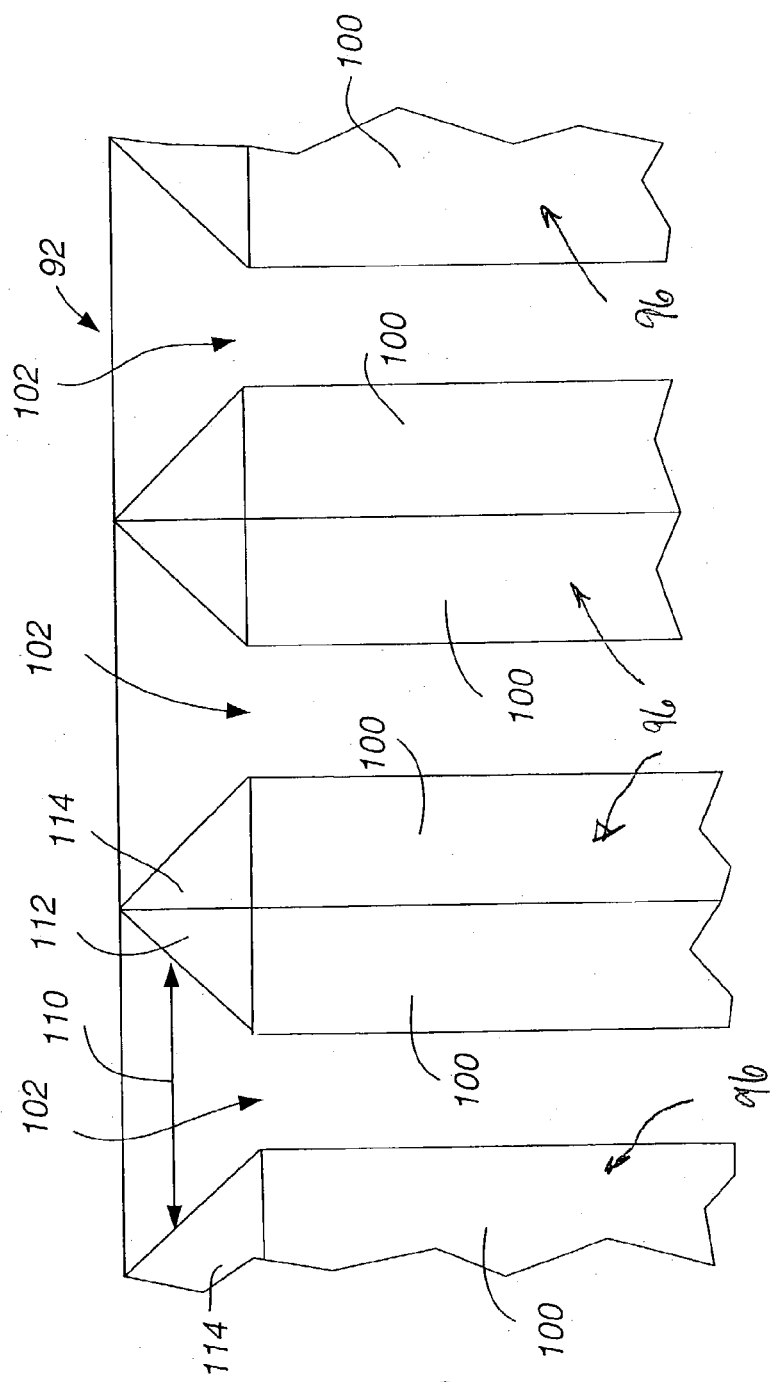
FIG. 33 is a front elevation view of the side wall member of FIG. 32.

In an alternative embodiment, shown in FIGS. 32 and 33, the teeth 96 may also be angled at their leading edges to create a widened entry way 110 not present in the embodiment of FIGS. 30 and 31. The widened entry way formed by the beveled surfaces 112, 114 of each tooth 96, further facilitates merging of disks, as shown in FIG. 31. This widened entry way 110 facilitates movement of two disks into each channel 102 to ensure that disks spaced apart on the mandrel 12 or 50 properly realign into pairs of contact merge disks, with one pair of disks in each channel 102.

Figure 15:
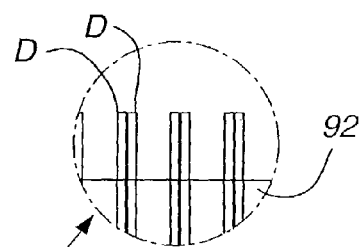
FIG. 15 is a partial exploded view taken from FIG. 13 showing the upper perimeter edges of a few disk pairs.
Figure 14:
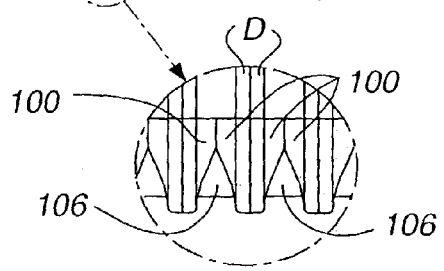
FIG. 14 is a partial exploded view taken from FIG. 13 showing the lower perimeter edges of a few disk pairs.

In much the same way, the pairs of gap merge disks shown in FIGS. 8–11 can be repositioned into a concentric contact merge orientation as shown in FIGS. 13–15. The rows of teeth 96 disposed along the inside of the cassette 10 are sized to force the disks into a contact merge orientation. The teeth have angled side walls 100 which gradually force the disks into contact, which is illustrated in FIGS. 14 and 15.

The cassette 80 may be used in various manufacturing processes where pairs of disks are removed from the cassette one pair at a time for processing and returned to the cassette following processing. As each pair is returned, the position of the cassette relative to the processing equipment may be adjusted to facilitate removal of the next pair. Adjustment of the position of the cassette may be accomplished by placing the cassette in a guide or holder which is preprogrammed to adjust the position of the cassette the desired incremental amount. Alternatively, the cassette may include one or more reference or index marks which are used to adjust and align the cassette relative to the processing equipment. The index mark may be a hole or mark on the cassette body or, with available optical systems, an existing feature of the cassette, such as a corner of the end wall or other edge, may serve as the reference mark.

As stated previously, it should be understood that the receiving cassette can be adapted to position the disks in a gap merge orientation or an evenly spaced orientation. If a gap merge orientation is desired, the cassette shown in FIGS. 20–29 herein, can be replaced, for example, with the cassette shown in co-pending U.S. patent application Ser. No. 10/535,161 entitled "W-patterned Tools for Transporting/ Handling Pairs of Disks" in the name of Buitron et al. (Publication No. US-2003-0209421-A), filed May 9, 2003, the entirety of which is incorporated herein by reference as if fully stated herein. This application is owned by the Assignee.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for manufacturing hard memory disks for use in a disk drive, the disks having a central aperture that defines an inside edge, the method comprising:
   a. Placing a plurality of disks in a carrier, wherein the disks are positioned in pairs which have a gap merge orientation;
   b. Removing the plurality of disks from the carrier at least one pair at a time using a mandrel device that engages the inside edge of each disk;
   c. Substantially simultaneously surrounding the removed disks with lubricating fluid;
   d. Returning the plurality of lubricated disks to a carrier.

2. The method of claim 1, further comprising creating equal spacing between all disks upon removal of the plurality of disks from the carrier.

3. The method of claim 2, wherein the spacing between disks is approximately 0.075 inches.

4. The method of claim 1, wherein surrounding the disks with lubricating fluid further comprises placing the disks in a chamber.

5. The method of claim 4, wherein the lubricating fluid is added to the chamber following placing the disks in the chamber.

6. The method of claim 4, wherein the lubricating fluid is added to the chamber before placing the disks in the chamber.

7. The method of claim 1, wherein the plurality of disks comprises 25 pairs of disks.

8. The method of claim 1, wherein said step of returning said plurality of disks to a carrier comprises returning said plurality of disks to a carrier that is different from the carrier in which the plurality of disks are initially placed.

9. The method of claim 1, wherein said step of returning said plurality of disks to a carrier further comprises changing the spacing between disks.

10. The method of claim 1, wherein said step of returning said plurality of disks to a carrier comprises removing at least some of the space between the disks.

11. The method of claim 1, wherein the spacing between adjacent pairs of disks where each pair of disks is in a gap merge orientation is between 0.085 and 0.130 inches.

12. A method for manufacturing single-sided hard memory disks, the disks including an outside perimeter edge and a central aperture defining an inside edge, the method comprising:
   a. positioning a plurality of pairs of single-sided disks which have a gap merge orientation in a cassette;
   b. substantially simultaneously engaging all of the disks at three separate positions along the inside edge of each disk with a mandrel device;
   c. following step b, and without disengaging the disks, lifting the disks from the cassette;
   d. as part of steps b and c, creating a substantially uniform space between each of the disks;
   e. following steps a–d, and without disengaging the disks, substantially simultaneously exposing the disks to a liquid lubricant;
   f. following step e, returning the disks to a cassette.

13. The method of claim 12, wherein said exposing the disks to a liquid lubricant comprises surrounding the disks with a liquid lubricant.

14. The method of claim 12, wherein engaging all of the disks at three separate positions along the inside edge of each disk comprises inserting a three-pronged mandrel in the central aperture of the disks.

15. The method of claim 12, wherein creating a substantially uniform space between each of the disks comprises engaging the disks with a mandrel having uniformly sized teeth spaced uniformly along the length of the mandrel to form uniformly space notches to position the disks.

* * * * *